United States Patent [19]

Maruyama et al.

[11] Patent Number: 5,029,736
[45] Date of Patent: Jul. 9, 1991

[54] MEASURING CAP

[75] Inventors: Takashi Maruyama; Masatoshi Fujima, both of Tokyo, Japan

[73] Assignee: Toppan Printing Co., Ltd., Japan

[21] Appl. No.: 386,989

[22] Filed: Jul. 28, 1989

Related U.S. Application Data

[63] Continuation-in-part of Ser. No. 144,932, Jan. 15, 1988, abandoned, which is a continuation-in-part of Ser. No. 816,759, Jan. 7, 1986, abandoned.

[30] Foreign Application Priority Data

Jan. 9, 1985 [JP] Japan .................................. 60-1063

[51] Int. Cl.⁵ .............................................. G01F 11/26
[52] U.S. Cl. ...................................... 222/455; 222/456
[58] Field of Search ............... 222/444, 450, 455, 456, 222/454, 142.9

[56] References Cited

U.S. PATENT DOCUMENTS

| | | | |
|---|---|---|---|
| 2,241,044 | 5/1941 | Stenberg | 222/142.9 |
| 2,243,452 | 5/1941 | Bickel et al. | 222/455 |
| 2,739,741 | 3/1956 | Barnett | 222/456 |
| 2,853,213 | 9/1958 | Buehlig | 222/455 |

FOREIGN PATENT DOCUMENTS 643295 10/1957 Italy ........................... 222/456

Primary Examiner—Joseph E. Valenza
Assistant Examiner—Kenneth Noland
Attorney, Agent, or Firm—Lerner, David, Littenberg, Krumholz & Mentlik

[57] ABSTRACT

A measuring cap is disclosed, which is adapted for mounting on container openings to supply controlled portion of the container contents such as powders and the like therefrom. The measuring cap includes a cup-like body including a primary measuring section for holding a portion of the container contents and a side wall including an inlet, and a secondary cap body including a top wall defining an outlet which communicates with the cup-like body through an outlet passage which is itself defined by a depending wall which separates the outlet passage from the inlet and defines a secondary measuring section adjacent to the inlet. In this manner, upon inversion of the container, a portion of its contents can enter the secondary measuring section through the inlet and upon subsequent return of the container to its normal upright position that portion of the container contents can enter the cup-like body whereupon with further inversion of the container the controlled portion of the container contents can exit through the outlet.

22 Claims, 7 Drawing Sheets

FIG. 11
FIG. 12
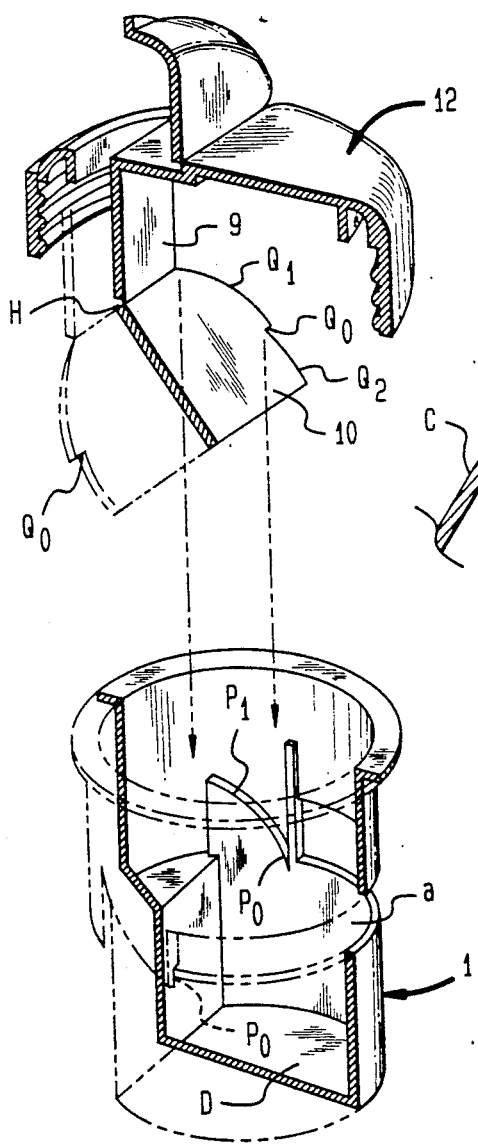
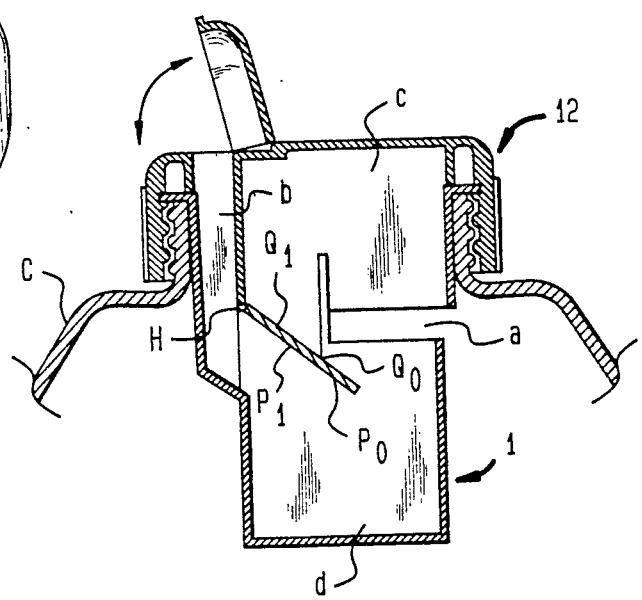

MEASURING CAP

BACKGROUND OF THE INVENTION

1. Field of the Invention

This application is a continuation-in-part of application Ser. No. 144,932, filed on Jan. 15, 1988 now abandoned, which is a continuation-in-part of application Ser. No. 816,759, filed on Jan. 7, 1986 now abandoned.

The present invention relates to a cap for a container. More particularly, the present invention relates to a measuring cap which is designed so that the cap can be attached to containers having contents in the form of powder or granules, such as detergents, washing assistants, fertilizers, medicines, and medical supplies, for the purpose of supplying the contents from the container only in controlled amounts to thereby prevent any excessive use. The cap may easily be handled with one hand.

2. Description of the Prior Art

In the known methods for the quantitative discharge of powdery or granular contents (hereinafter merely referred to as "contents") from containers, the contents of the container are normally successively subdivided. According to these methods, a plural number of small chambers separated by a subdivision must be provided within the measuring cap, and in addition, a plurality of passages must also be provided.

Therefore, these measuring caps themselves are of a very large size, and at present, the ratio of the volume of a single discharge portion to the volume occupied by the measuring cap is less than 10%. In such measuring caps thus attached to the container opening the required head space with respect to the contents within the container greatly increases, and the container itself thus increases in size for the quantity of its contents, thereby rendering it difficult to- put it to practical use.

Alternatively, covers may also be provided on an inlet and outlet of the passage, or of the small chamber, so that the cover may be opened and closed in order to increase the quantity of contents discharged therefrom. In that case, however, the construction of the cap becomes complicated, and the contents are apt to be blocked so as not to flow smoothly out of the container, while the cost of same also increases.

Accordingly, it is an object of the present invention to employ a method in which the contents are once introduced into a container cap so as to provide for a standard, and a measuring cup is prepared separately therefrom.

SUMMARY OF THE INVENTION

In accordance with the present invention, a measuring cap is thus provided in which the contents are introduced directly from the side of a body of the measuring cap without using a passageway which deteriorates the efficiency of the discharge of the container contents and this is accomplished within a partitioned spare chamber in order to greatly enhance the efficiency thereof. The measuring cap also has a low manufacturing cost, and increased stability of discharge, and can be simply handled with great practicality.

In accordance with one embodiment of the present invention, a measuring cap is provided which is adapted to be mounted on an opening of a container for the supply of controlled portions of the contents of the container from the opening upon inversion of the container from its normal upright position. The measuring cap thus comprises a primary cap body having an upper portion adapted to be mounted on the container opening, a lower portion providing a primary measuring section for holding a portion of the container contents, a side wall portion connecting the upper and lower portions, the side wall portion including an inlet means for permitting entry of the container contents into the measuring cap, and a secondary cap body adapted to fit within the primary cap body, the secondary cap body including a top wall portion for closing a portion of the upper portion of the primary cap body and defining an outlet for the measuring cap, the outlet being in communication with the lower portion of the primary cap body by means of an outlet passage which is defined by a depending wall member separating the outlet passage from the inlet means and defining a secondary measuring section adjacent to the inlet means, whereby upon inversion of the container from its normal upright position the portion of the container contents can enter into the secondary measuring section through the inlet means, and upon subsequent return of the container to its normal upright position the portion of the container contents can enter the primary measuring section, so that upon subsequent inversion of the container the controlled portion of the contents of the container can exit from the container through the outlet passage.

In accordance with another embodiment in the measuring cap of the present invention, the depending wall member includes an inclined wall portion being inclined at an angle of repose of the contents of the container.

In accordance with another embodiment in the measuring cap of the present invention, there is provided a measuring supplemental zone continuously extending to the primary measuring section between a lower portion of the inlet means and a lower portion of the inclined wall portion, wherein the measuring supplemental zone has a volume sufficient for receiving that quantity of the contents of the container by which the shortage of the contents, i.e., powdery grains, in the primary measuring section is to be supplemented.

In accordance with another embodiment in the measuring cap of the present invention, the depending wall member comprises a vertical wall portion extending downwardly from the top wall of the secondary cap body, and the inclined wall portion projecting into the primary cap body therefrom.

In accordance with another embodiment of the measuring cap of the present invention, the lower portion of the primary cap body is substantially cylindrical, and includes a depressed portion on the side of the lower portion adjacent to the outlet passage.

In accordance with another embodiment of the measuring cap of the present invention, a hinged cover portion is included for closing the outlet.

BRIEF DESCRIPTION OF THE DRAWINGS

In order to more fully appreciate the subject matter of the present invention, reference is made to the following detailed description thereof, and to the attached drawings showing various embodiments of the present invention, and wherein;

FIG. 11 is an unassembled perspective view of the measuring cap in accordance with the fourth embodiment; and FIG. 12 is a sectional view of the measuring cap of FIG. 11 in an assembled state.

DETAILED DESCRIPTION OF THE PREFERRED EMBODIMENTS

Figure 1:
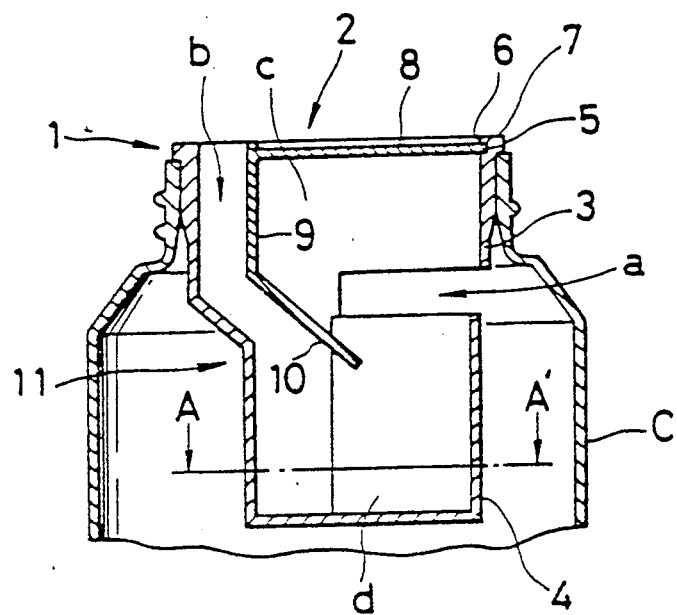
FIG. 1 is a side, partial, sectional view of the measuring cap of the present invention attached to a container opening.
Figure 2:
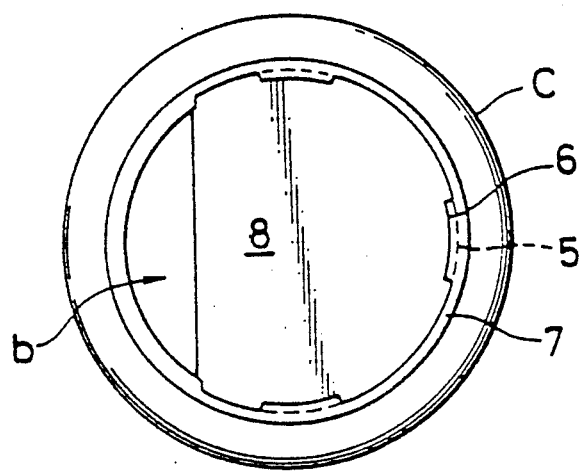
FIG. 2 is a top, plan view of the measuring cap of FIG. 1.

Referring to FIG. 1, a measuring cap according to one embodiment of the present invention is shown therein, and comprises a body 1 and a partitioning portion 2.

The body 1, which is formed from a cup-shaped integral molded article, comprises a circumferential wall 3, a bottom wall 4, and an inlet a which is provided between circumferential wall 3 and bottom wall 4.

The bottom wall 4, as shown in FIG. 1, includes a portion in the form of a depressed portion 11, which is inwardly positioned on the opposite side from inlet a. Notches 5 and projections 6 are provided internally on the upper end of the circumferential wall 3 to receive partitioning portion 2, and a flange 7 is provided externally on the upper end of the circumferential wall 3 to prevent it from the falling into the container. The inside diameter of circumferential wall 3 corresponds to the outside diameter of bottom wall 4, so that a half portion on the side of inlet a of the bottom wall 4 may be molded integrally with both the other half and with circumferential wall 3. This is done so that injection molding equipment may employ the simplest mold construction without the use of a slide core.

The partitioning portion 2 is in the form of an integrated molded article which comprises a top wall 8, a vertical plate 9 and an inclined plate 10 which is inclined at an angle of repose of received powdery grains. The angle of repose is the index which indicates the degree or extent that a mountainous stacked powder or granular material remains stable without crumbling, which stack is considered to be conical in shape. The angle of repose is formed between a horizontal plane and a slanting line extending upwardly therefrom along the conical stack. Accordingly, when the actual angle formed exceeds the angle of repose, the mountainous stacked powder or granular material will begin to crumble.

Top wall 8 is fitted by the notches 5 and projections 6 located internally of the upper end of circumferential wall 3 of body 1. A provisional chamber c is surrounded by vertical plate 9, inclined plate 10, top wall 8 and circumferential wall 3 of the body 1, and is thus formed by the partitioning portion 2 within the body 1. A measuring supplemental zone is provided by a section which extends from the lower edge of the inlet a to the lower end of the inclined plate 10. A main measuring chamber d thus comprises a portion which is surrounded by the bottom wall 4 below the inclined plate 10.

Operation of the measuring cap according to the present invention is very simple. The container C is inclined to the extent that it is in an inverted attitude, and it is then restored again to its original state. Then, container C is further inclined to the extent that it is in an inverted attitude, and a predetermined quantity of the container contents are thus discharged, and the cap is also then ready for its next discharge. When the container C is inclined in the manner shown in FIG. 4, the contents separated within the main measuring chamber d may be discharged by passing through outlet b. At the same time, a portion of the contents within the container C also enters the provisional chamber c from the inlet a.

Inlet a is provided in the side of the body 1, and this forms one of the important characteristics of the present invention. In conventional measuring caps, the inlet is normally provided in the lower surface of the body (on the side opposite the outlet). The reason for this does not arise from the direction of flow of the contents within the container, but primarily results from the shape of the neck of the container. In the measuring caps of the system as of the present invention, the provisional section must be positioned above the main measuring section. Accordingly, in the case where the inlet is located below the body of the measuring cap, as in the prior art, the inlet must then extend through the main measuring chamber to the upper provisional section, and as a result thereof the volume of the main measuring chamber and the volume of the sectional area portion of the inlet of the provisional chamber are mere passages, which thus constitute a volume which cannot be used as a small chamber. Therefore, in order to secure the same amount of discharge, these conventional systems have a deteriorated efficiency, since these measuring caps must have a concomitantly greater volume than those of the system of the present invention.

In the measuring caps according to the present invention, the inlet is thus provided in the side of the body in order to increase the discharge efficiency, whereby the height of the container neck is thereby decreased in order to enhance the discharge efficiency by approximately 20% as compared with the conventional systems.

The inlet a of the body 1 must have a size which is sufficient to fill the provisional chamber c with container contents until a predetermined quantity of those contents have been discharged. However, if the size of the inlet is excessively large, the contents are returned from the inlet a into the container when the container is returned to its original vertical or upright position. In view thereof, in the measuring cap according to the present invention, the upper and lower widths of inlet a are decreased, and its lateral width reaches about half of the circumference of the body. In this manner, if the upper and lower widths of the inlet a are excessively large, the quantity of container contents which returns to the container increases excessively, and the provisional chamber c is filled with the contents within a predetermined time (time till completion of discharge)

by means of the lateral width thereof. The upper and lower widths of the inlet a all depend on the nature of the container contents and the quantity of material to be discharged therefrom, and in the present embodiment, the optimum width is 6 mm in the case of granules having a bulk specific gravity of 0.76, and a discharge quantity of 10 g, while the lateral width need not be limited to a length which extends around half of the circumference of the body.

The contents entering from inlet a are prevented from flowing into the main measuring chamber d by the presence of vertical plate 9 and inclined plate 10, and is therefore not discharged directly through the outlet b. Therefore, the lower end of inclined plate 10 is located at predetermined position which is selected so that when the container is inclined by about 30 degrees or more from the horizontal, the contents naturally entering through inlet a may be captured thereby. Preferably, the volume of provisional chamber c is preset so that a loss portion from inlet a can be provided for when the container is returned to its original vertical or upright position, and the overall amount may be made 20 to 30 percent greater than the discharge quantity in view of the stability of the discharge, which is described below.

Figure 3:
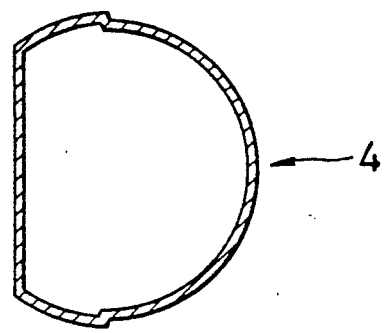
FIG. 3 is a top, sectional view of the measuring cap of FIG. 1, taken along line A—A', thereof.

When container C is returned to its original vertical position, as shown in FIG. 1, the contents within provisional section c enter main measuring chamber d. The main measuring chamber d, as indicated, comprises the lower portion of the cap, from the lower end of the inclined plate 10. When the container contents are a powder, for example, the contents are not filled horizontally in the lower side of inclined plate 10, and in that condition where this surface is inclined, the surface reaches the bottom wall 4 on the side of the outlet b from the lower end of the inclined plate. That is, where there is a lengthy horizontal distance from the lower end of inclined plate 10 to the bottom wall 4 on the side of the outlet b, the inclined surface of the contents which is lower than the inclined plate 10 also becomes lengthy, and as a result that inclined surface gets out of shape by the oscillations and vibrations which occur during use of the container. Therefore, the surplus quantity of contents entering the main measuring chamber d is not constant. Accordingly, the cap according to the present invention is devised so that, in order to position the bottom wall 4 close to the inclined plate 10, a depressed portion 11 is provided at the location as shown in FIGS. 1 and 3, so as to shorten the inclined surface of the container contents.

The measuring supplemental zone, which continuously extends to the main measuring chamber d, has a predetermined discharge volume, in addition to an expected volume shortage of the contained contents due to the presence of the inclined surface of inclined plate 10. This zone is designed so that the volume of the measuring supplemental zone plus the volume of the main measuring chamber will be smaller than the volume of the contents received in the provisional chamber c.

The main measuring chamber d therefore has a reduced volume which relies upon the reduced portion of the contents created by the presence of the inclined surface in addition to a predetermined quantity of discharge as required, and is designed to have a volume which is smaller than the volume of the contents which remains in provisional chamber c.

Figure 4:
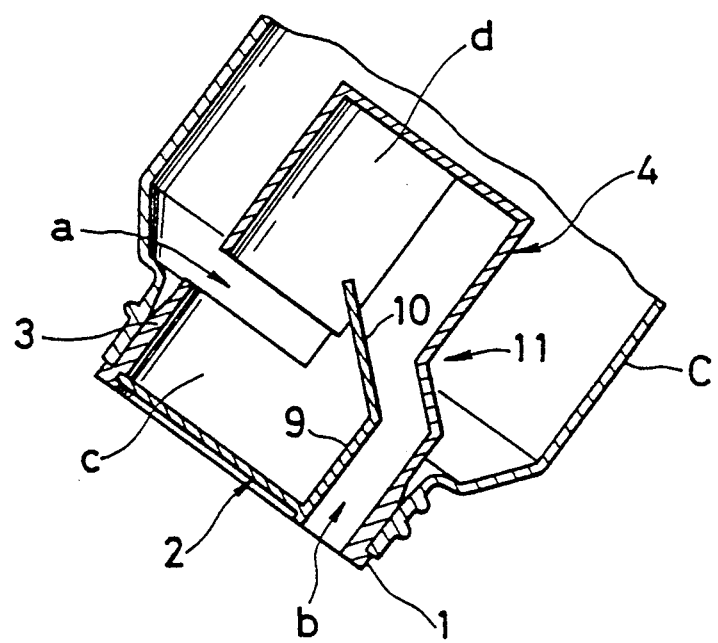
FIG. 4 is a side, partial sectional view of the measuring cap of FIG. 1, shown with the cap in its inclined position.
Figure 5:
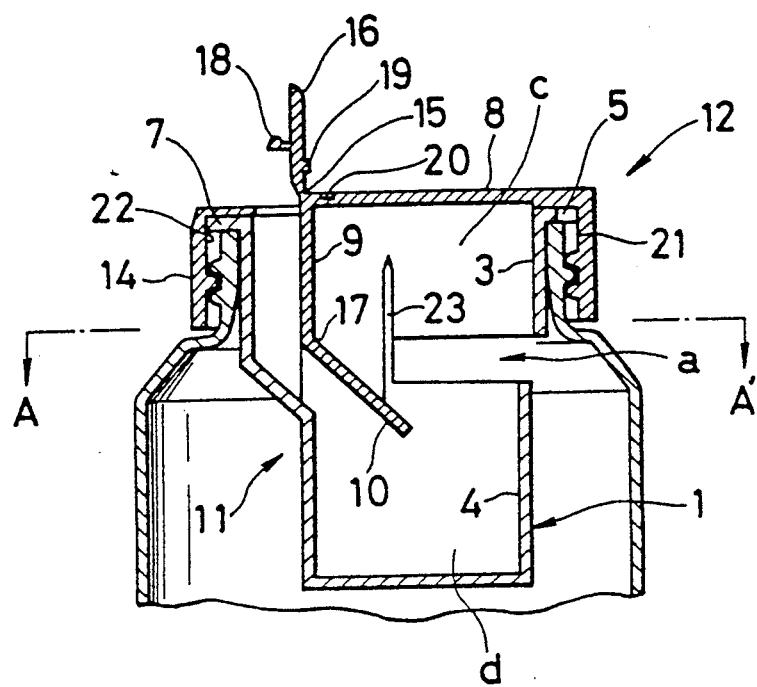
FIG. 5 is a side, partial sectional view of another embodiment of the measuring cap of the present invention attached to a container opening.
Figure 6:
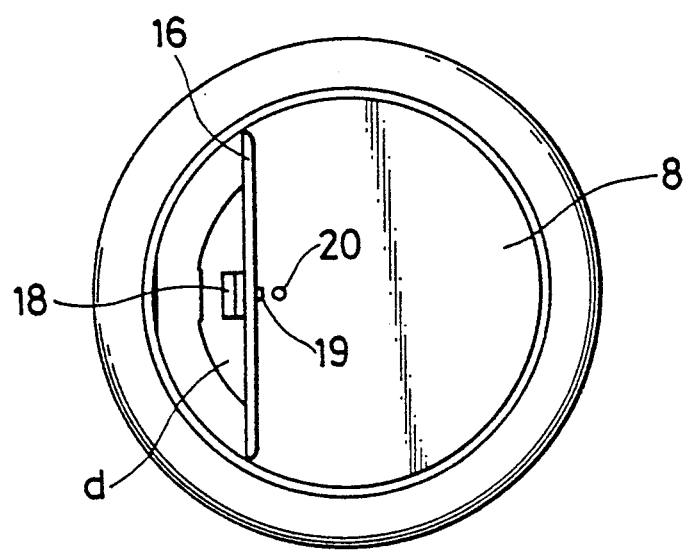
FIG. 6 is a top, plan view of the measuring cap of FIG. 5.

More specifically, provisional section c and main measuring chamber d are designed so that the contents in provisional chamber c fall into and fill the main measuring chamber d, and the surface of the contents is positioned in the measuring supplemental zone above the lower end of the inclined plate 10. This being the case, when container C is inclined as shown in FIG. 4 during subsequent discharge, the contents in main measuring chamber d moves to outlet b, the surplus contents positioned above the lower end of inclined plate 10 moves into the inner part of provisional chamber c, and the inclined plate 10 is thus divided into a main measuring portion and a surplus portion. Accordingly, even if the contents are secured in a quantity larger than the discharge quantity within provisional chamber c, the quantity of the contents which is actually discharged never exceeds the volume of the main measuring chamber d, thus obtaining the stabilized discharge quantity desired hereby.

The measuring cap of the present invention is constructed such that the shortage volume of the powdery grains in the main measuring chamber d may be supplemented by the powdery grains in the measuring supplemental zone, when the container is inclined. The function of the present invention will now be described in detail.

The inclined plate 10 is inclined at an angle $\theta$ of repose of the powdery grains received in the container, and the main measuring chamber d is continuously joined to the measuring supplemental zone with the interposition of a boundary at a horizontal level at the lower end of the inclined plate 10. When the container is caused to stand upright, the powdery grain surface on the side of the outlet b in the measuring chamber d conforms to an inclination angle $\alpha (0 \leq \alpha \leq \theta)$ with respect to the horizontal surface of the grains in the main measuring chamber d.

When the container is inclined, a certain amount of the powdery grains transfers from the measuring chamber d to the side of the outlet b therein, and as a result the contents in the main measuring chamber d decrease an equivalent amount corresponding to the volume of the transferred grains. Thus, the measuring supplemental zone contains the powdery grains in a maximum amount or more of the decreased powdery grains in the main measuring chamber d, i.e., in an equivalent amount or in excess of the transferred grains in declining the container at an angle $\theta$ of repose. When the measuring cap is inclined in excess of an inclination angle of $(\theta - \alpha)$ with respect to the horizontal surface, the powdery grains on the side of the outlet b in the measuring chamber d begin to flow downward.

In the situation where the measuring cap is inclined, the powdery grains in the measuring chamber d do not transfer to the side of the outlet b, when the inclination angle of the measuring cap is within the range of 0 to $(\theta - \alpha)$, so that similarly the powdery grains in the measuring supplemental zone do not move downward therefrom into the measuring chamber d. When the inclination angle of the measuring cap is between $(\theta - \alpha)$, and $\theta$, part of the powdery grains in the measuring supplemental zone are transferred to the measuring chamber d, since the inclined plate 10 has an inclination angle of $\theta$. The transferred powdery grains are thus added to the contents in the measuring chamber d, and a desired and measured amount of the powdery grains is then transferred to the side of the outlet b in the measuring chamber d. In this case, the powdery grains in the upper portion, i.e., provisional measuring chamber c, above the inclined plate 10 move toward the vertical plate 9 on the side of the inclined plate 10 without moving down into the measuring chamber d.

In summary, when the inclination angle of the measuring cap, i.e., the container, is within the range of $(\theta - \alpha)$ to $\theta$, the shortage of the powdery grains in the measuring chamber d is supplemented by the grains transferred from the measuring supplemental zone to the measuring chamber d, with the result that the powdery grains can be stably discharged therefrom through the outlet b.

Referring next to FIGS. 5-8, the measuring cap in accordance with another embodiment comprises a body 1, and a cap portion 12 which is used in place of partitioning portion 2.

Figure 7:
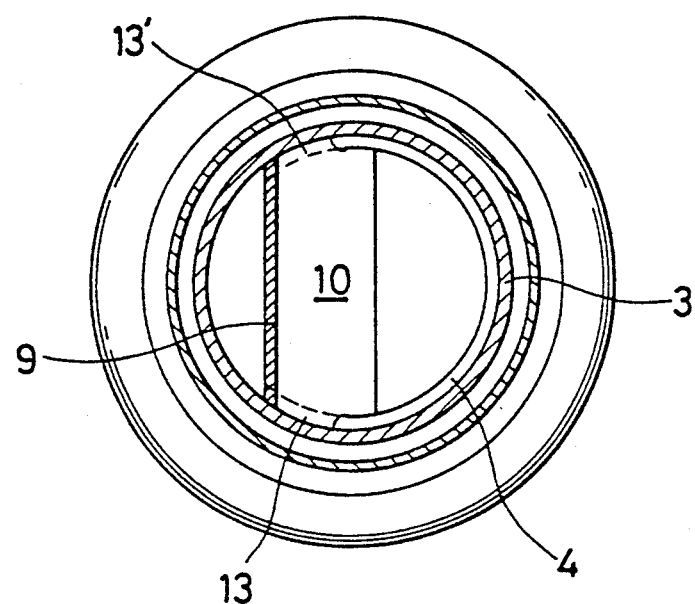
FIG. 7 is a top, sectional view of the measuring cap of FIG. 5 taken along line A—A', thereof.
Figure 8:
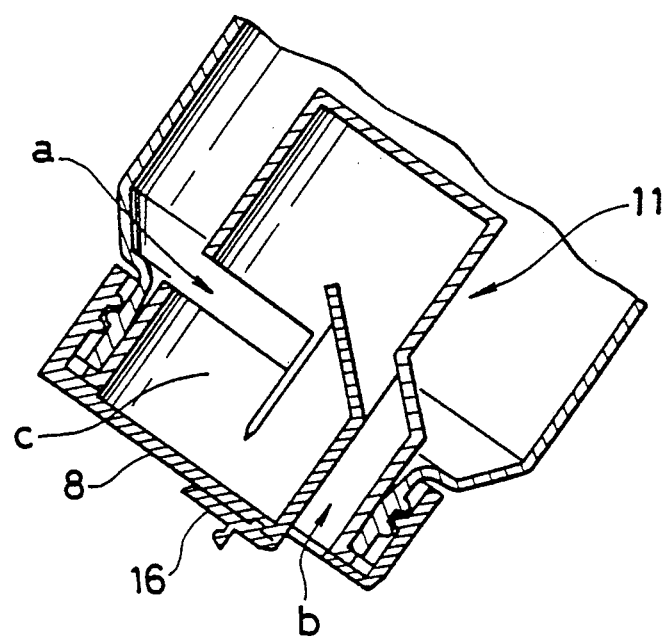
FIG. 8 is a side, partial sectional view of the measuring cap of FIG. 5, shown with the cap in its inclined position.

The body 1, which is formed from a cup-shaped integral molded article, comprises a circumferential wall 3 and a bottom wall 4. A semi-circumferential inlet a is provided at the boundary between the circumferential wall 3 and the bottom wall 4. An inwardly positioned depressed portion 11 is provided in the bottom wall 4 opposite inlet a, guide stepped portions 13 and 13', as shown in FIG. 7, are provided on the right and left sides, and a position-adjusting rib 23 is provided internally of the circumferential wall 3 upwardly from both ends of inlet a.

A flange 7 is connected to the upper end of circumferential wall 3, and part of this flange 7 is formed with a notch 5.

In order to integrally mold inlet a, the inside diameter of the circumferential wall 3 is made to be the same as the outside diameter of the bottom wall 4 in the boundary portion, the inlet thus being molded by the cutting of an injection molding mold.

The cap portion 12 is provided with a side wall 14, having a top wall 8 with internal threads. The top wall 8 is partly formed with a circular outlet b, and a cover portion 16 is attached to the top side by means of an upper hinge 15 forming a portion corresponding to a chord of the circular portion. A vertical plate 9 is also provided on the lower side of the top wall 8, and an inclined plate 10 is provided at the end thereof, through a hinge 17, vertical plate 9 and inclined plate 10 being molded in a position substantially vertical to top wall 8.

The internal threads of side wall 14 are adjusted to those of the container, but cannot be subjected to circular milling of a release in injection molding. Therefore, forcible drawing is employed for such molding. Accordingly, this can be in the form of a cap-hammer instead of threads.

Cover portion 16 is further provided with a projection 18 which is intended to be fitted when the cover is closed, a raised portion 19 which is intended to open and lock the cover, and a recessed portion 20 which is intended to engage raised portion 19.

The measuring cap according to the present invention comprises the combination of body 1 and cap portion 12. The body 1 is adjusted horizontally with respect to the cap portion 12 so that the inlet a may be positioned opposite to the outlet b. First, when the end of inclined plate 10 of the cap portion 12 impinges upon the guide stepped portions 13 and 13,, of the body 1, and is further pushed in, it is bent from the lower hinge 17 between inclined plate 10 and vertical plate 9, and inclined plate 10 is moved along guide stepped portions 13 and 13'. When the flange 7 of body 1 reaches top wall 8 of the cap portion 12, the vertical plate 9 of the cap portion 12 and the inclined plate 10 are set in the condition shown in FIG. 5, and the notch 5 of the body 1 fits into stop rib 21 of cap portion 12 so as to effect positioning between the body 1 and the cap portion 12. For convenience during capping, a circumferential rib 22 is preferably provided to fit the outer circumference of flange 7 of body 1 into the internal upper portion of side wall 14 of cap portion 12.

In the embodiment of the present invention as described above, inlet a is positioned below the provisional chamber c, which is surrounded by circumferential wall 3, top wall 8, vertical plate 9 and inclined plate. 10. The remaining portion of circumferential wall 3 serves as the outlet b, and the portion from the lower end of inclined plate 10 to bottom wall 4 serves as the main measuring chamber d.

The operation of the measuring cap as described above is very simple. The cap need not be removed from the container body as is the case with various conventional containers. The cover portion 16 connected to the cap portion 12 may be opened, and raised portion 19 is provided to serve as a stopper, and may be fitted into the recessed portion 20. Operation similar to that of the previous embodiment may then be carried out.

As described above, the cap according to the present invention comprises two members. The inlet a is provided in the side, and the cup-like body portion 1 is merely fitted to the partitioning portion 2 or the cap portion 12 to thereby divided into provisional section c, main measuring section d and outlet b, making it possible to provide for the quantitative discharge of the container contents therefrom. The cap of the present invention is simple to construct and easy to manufacture. Furthermore, since the inlet a is provided in the side of the body it is possible to enhance the efficiency of discharge of the predetermined quantity of the container contents. Moreover, an extremely practical and excellent measuring cap is provided which can continuously discharge a predetermined quantity of the container contents by a simple operation, i.e. by merely inclining the container.

The present invention, as thus far described, is characterized by disposing the inclined plate 10 having an angle of repose of the powdery grains so that the lower end of the inclined plate 10 may be below the lower edge of the inlet a, and arranging the measuring supplemental zone continuously extending to the measuring chamber d between the lower edge of the inlet a and the lower end of the inclined plate 10. As a result, the powdery grains in the measuring supplemental zone are transferred to the measuring chamber d, when the container is inclined, in order to supplement the shortage of the powdery grains in the measuring chamber d and to thereby ensure a stable discharge of the powdery grains therefrom.

Figure 9:
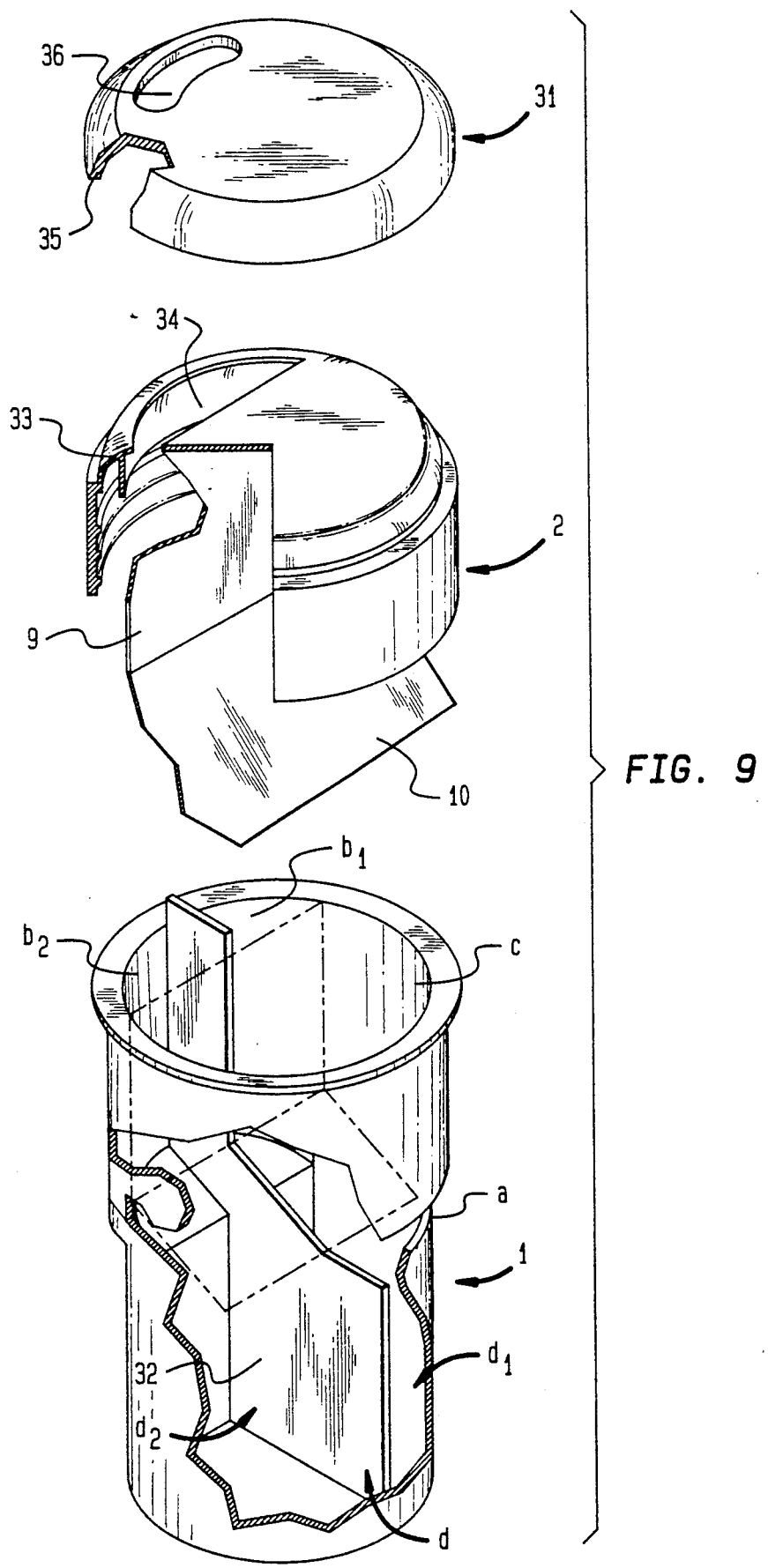
FIG. 9 is an unassembled perspective view of the measuring cap in accordance with another embodiment of the present invention.
Figure 10:
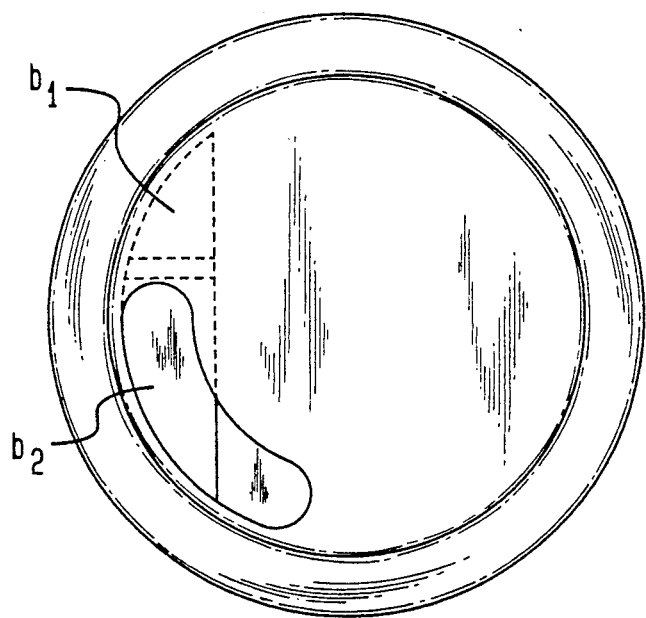
FIG. 10 is a top plan view of the measuring cap of FIG. 9.

Referring to FIG. 9, the measuring cap in accordance with another embodiment is constructed of body 1, a cap portion 2 and an over-cap portion 31. The body 1 has a partitioning plate 32 provided thereon. The partitioning plate 32 is designed so as to divide, at a specific rate which will be described later, the outlet b and the measuring chamber d which are formed by fitting the body 1 to the cap portion 2. Accordingly, the upper end of the outlet b of the partitioning plate 32 is at the upper surface of the cap portion 2, and the upper end of the measuring chamber d is at the level of the lower end of the inclined plate 10, and in contact with the vertical plate 9 and the inclined plate 10.

The cap portion 2 is formed with a circumferential recess 33 into which is fitted the over-cap portion 31, and an opening 34 is provided in an extension of the outlet b. The over-cap portion 31 is partly provided with a convex portion 35 in which is fitted the circumferential recess 33 formed in the cap portion 2 so that it may be rotated with respect to the cap portion 2. An outlet 36 is positioned in the outlet b. The outlet 36 has a configuration such that the outlets $b_1$ and $b_2$, which are divided by the partitioning plate 32, may be opened individually or both at the same time.

With the measuring cap mounted in the opening of the container, the contents of the container can be quantitatively discharged by the operation of inclining and returning the container to its upright position. When the container is inclined, the contents in the container fill the provisional measuring chamber c from the inlet a. When the container is returned to its original vertical position, the contents in the provisional measuring chamber c flow into each of the lower divided measuring chambers $d_1$ and $d_2$. When the container is subsequently inclined, the contents within the container flow into the provisional measuring chamber c and at the same time, the contents in the measuring chambers $d_1$ and $d_2$, respectively. Accordingly, if the over-cap portion 31 is in a position to block the outlet $b_1$, the contents in the measuring chamber $d_1$ stay within the outlet $b_1$, and only the contents in the measuring chamber $d_2$ are discharged through the outlet $b_2$.

Next, when the container is returned to its original vertical state, the contents remaining within the outlet $b_1$ return into the measuring chamber $d_1$ and at the same time the contents in the provisional measuring chamber c flow into the measuring chambers $d_1$ and $d_2$. At such time, the contents returning from the outlet $b_1$ have already once been present in the measuring chamber $d_1$, while the contents in the provisional measuring chamber c flow into the measuring chamber $d_2$ with the surplus contents thereto remaining on the inclined plate 10 for use with the next dispensing operation. Thus, the contents of the container may be selectively discharged where only the outlet $b_1$ is opened, and where only the outlet $b_2$ is opened. It is contemplated that a seal can be made by closing both the outlets.

If the position of the partitioning plate 32 is arranged so that the capacity ratio of the measuring chambers $d_1$ and $d_2$, corresponding to the outlets $b_1$ and $b_2$, are made at specific ratios to be discharged, for example, 1:2, 2:3, the amount of the contents discharged can be varied merely by turning the over-cap 31 to deviate its position, to 1, 2, 3 in case of the former, and 2, 3, 5 in the case of the latter. Although powdery detergent or the like differs in its amount of use depending on the quantity of water, the quantitative discharge adjusted to the quantity of water used for a washing machine, buckets, washbasins and the like can be simply selected without disengaging the measuring cap, thus being practical without waste use of detergent.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

In a fourth embodiment shown in FIGS. 11 and 12 of the present invention, the partitioning plate 9, 10 includes an inclined wall 10 which is hinged to the vertical plate 9 as to be described. The measuring cap 12 is integrally molded with both the vertical plate 9 and the inclined wall 10. If the measuring cap 12 is molded in a condition where a portion of the partitioning plate is inclined, i.e., inclined wall 10, the mold cannot be removed therefrom.

The reason why a portion of the partitioning plate is inclined is to supplement the shortage of measurement that may be accomplished by the measuring operation.

The method for molding the measuring cap 12 according to the present embodiment is accomplished in a procedure wherein the vertical plate 9 and the inclined wall 10 of the partitioning plate 9.10 are made integral with each other through hinge H, whereby the partitioning plate is initially molded in a flat condition and then released from the mold, after which the lower portion extending from the hinge H of the partitioning plate is bent at a predetermined angle to thereby form the inclined wall 10.

In the case where the cap measuring 12 is mounted on the top of a cup-like body, the angle of inclination of the inclined wall 10 of the partitioning plate is not locked to a predetermined angle due to the presence of the hinge H. The reason is that when a controlled amount of the content is discharged from the measuring cap 12, the inclined wall 10 of the partitioning plate is apt to receive pressure force by the content which moves within the measuring cap. If the inclined wall 10 is not firmly locked at the predetermined angle, the passage where the content is discharged becomes narrower to prevent the content from being smmothly discharged or otherwise an amount of the content, which is to be fed from the replenishing portion into the measuring chamber, becomes unstable, and therefore the user of the measuring cap will be encountered with the problem that the amount of the content cannot be accurately measured.

A manner of locking the inclined wall 10 of the partitioning plate at the predetermined angle is explained in detail with reference to FIGS. 11 and 12 notched. Portions $Q_O$ formed in the edges of inclined wall 10 come into engagement with V-shaped roots $P_o$ of a rib so that the inclined wall is firmly locked. The length of $P_o$-$P_o$ is substantially equal to the length of $Q_o$-$Q_o$.

What is claimed is:

1. A measuring cap adapted to be mounted on an opening of a container for the supply of controlled portions of the contents of said container from said opening upon inversion of said container from its normal upright position, said measuring cap comprising a primary cap body having an upper portion adapted to be mounted on said opening of said container, a lower portion providing a primary measuring section for holding a portion of said contents of said container, and a sidewall portion connecting said upper and lower portions, said sidewall portion including inlet means for permitting entry of said contents of said container into said measuring cap, and a secondary cap body adapted to fit within said primary cap body, said secondary cap body including a top wall portion for closing a portion of said upper portion of said primary cap body and defining an outlet for said measuring cap, said outlet being in communication with said lower portion of said primary cap body by means of an outlet passage, said outlet passage being defined by a depending wall member having an inclined wall portion attached by a hinged portion separating said outlet passage from said inlet means and defining a secondary measuring section adjacent to said inlet means, said inclined wall portion being inclined at an angle of repose of said contents of said container, said secondary measuring section including a measuring supplemental zone extending between a lower portion of said inlet means and a lower portion of said inclined wall portion, said measuring supplemental zone having a capacity sufficient for receiving a quantity of said contents of said container at least corresponding to an amount of the shortage by which said contents in the primary measuring section is supplemented, whereby upon inversion of said container from its normal upright position and said portion of said contents of said container can enter said secondary measuring section through said inlet means, and upon subsequent return of said container to its normal upright position said portion of said contents of said container can enter said primary measuring section, so that upon subsequent inversion of said container said controlled portion of said contents of said container can exit from said container through said outlet passage.

2. The measuring cap of claim 1 wherein said depending wall member further includes a vertical wall portion extending downwardly from said top wall of said secondary cap to said inclined wall portion which projects into said primary cap body.

3. The measuring cap of claim 1 wherein said lower portion of said primary cap body is substantially cylindrical, and includes a depressed portion on the side of said lower portion adjacent to said outlet passage.

4. The measuring cap of claim 1 including a hinged cover portion for closing said outlet.

5. The measuring cap of claim 1 wherein said secondary measuring section has a larger volume capacity than said primary measuring section to insure that a proper amount of said contents are dispensed when said container is inverted from its normal upright position to its inverted position.

6. The measuring cap of claim 5, wherein said primary measuring section includes a portion extending above the lower end of said inclined wall portion whereby said contents within said portion of said primary measuring section are not discharged from said primary measuring section upon inversion of said container for discharge of said contents.

7. The measuring cap of claim 1 further including partitioning means dividing said primary measuring section and said outlet passage into first and second portions.

8. The measuring cap of claim 7 wherein said first portion has a volume equal to said second portion.

9. The measuring cap of claim 8 wherein said first portion has a volume different from a volume of said second portion.

10. The measuring cap of claim 7 further including an over-cap portion movably mounted to said primary cap body, said over-cap portion having an opening registrable with at least one of said first and second portions.

11. The measuring cap of claim 10 wherein said opening is registrable concurrently with said first and second portions.

12. The measuring cap of claim 1 wherein said inlet means divides said sidewall portion into an upper sidewall portion and a lower sidewall portion and being substantially perpendicular to said sidewall.

13. The measuring cap of claim 1, further including securing means for securing said inclined wall portion at a predetermined angle to said depending wall member.

14. The measuring cap of claim 13, wherein said securing means comprises a notched portion provided on said inclined wall portion for engaging a portion of said cap body.

15. A measuring cap to be mounted on an opening of a container for the supply of controlled portions of the contents of said container from said opening upon inversion of said container from its normal upright position, said measuring cap comprising a primary cap body having an upper portion adapted to be mounted on said opening of said container, a lower portion providing a primary measuring section for holding a portion of said contents of said container, and a sidewall portion including inlet means for permitting entry of said contents of said container into said measuring cap, and a secondary cap body adapted to fit within said primary cap body and defining an outlet for said measuring cap, said outlet being in communication with said lower portion of said primary cap body by means of an outlet passage, said outlet passage being defined by a depending wall member, said depending wall member having a vertical wall portion and an inclined wall portion projecting into said primary cap body, said inclined wall portion attached to said vertical wall portion by means of a hinged portion, securing means for securing said inclined wall portion at a predetermined angle to said vertical wall portion, said depending wall member separating said outlet passage from said inlet means and defining a secondary measuring section adjacent to said inlet means, whereby upon inversion of said container from its normal upright position said portion of said contents of said container can enter said secondary measuring section through said inlet means, and upon subsequent return of said container of its normal upright position said portion of said contents of said container can enter said primary measuring section, so that upon subsequent inversion of said container said controlled portion of said contents of said container can exit from said container through said outlet passage.

16. The measuring cap of claim 15, wherein said securing means comprises a notched portion provided on said inclined wall portion for engaging a portion of said cap body.

17. The measuring cap of claim 15, wherein said inclined wall portion, said hinged portion and said vertical wall portion are integrally formed.

18. A measuring cap to be mounted on an opening of a container for the supply of controlled portions of the contents of said container from said opening upon inversion of said container from its normal upright position, said measuring cap comprising a cap body having inlet means for said contents of said container, an outlet passage for said contents from said measuring cap, said outlet passage being defined by a depending wall member, said depending wall member having a vertical wall portion and an inclined wall portion, said inclined wall portion attached to said vertical wall portion by means of a hinged portion whereby said inclined wall portion can be arranged at a predetermined angle to said vertical wall portion, securing means for securing said inclined wall portion at a predetermined angle to said vertical wall portion, said depending wall member separating said outlet passage from said inlet means, whereby upon inversion of said container from its normal upright position, return of said container of its normal upright position, and subsequent inversion to said container the controlled portion of said contents of said container exit from said container through said outlet passage.

19. The measuring cap of claim 18, further including securing means for securing said inclined wall portion at a predetermined angle to said vertical wall portion.

20. The measuring cap of claim 19, wherein said securing means comprises a notched portion provided on said inclined wall portion for engaging a portion of said cap body.

21. The measuring cap of claim 18, wherein said inclined wall portion, said hinged portion and said vertical wall portion are integrally formed.

22. The measuring cap of claim 18, wherein said inclined wall portion is initially integrally formed in coplanar relationship with said vertical wall portion, and subsequently secured at said predetermined angle prior to use of said measuring cap.

* * * * *

UNITED STATES PATENT AND TRADEMARK OFFICE
CERTIFICATE OF CORRECTION

PATENT NO. : 5,029,736

DATED : July 9, 1991

INVENTOR(S) : Takashi Maruyama; Masatoshi Fujima

It is certified that error appears in the above-identified patent and that said Letters Patent is hereby corrected as shown below:

Column 1, line 37, "to-" should read --to--.
Column 7, line 63, "13,," should read --13',--.
Column 10, line 23, "cap measuring 12" should read --measuring cap 12--.
Column 10, line 42, "12 noticed. Por-" should read --12. Notched
  portions--.

Signed and Sealed this

Fifteenth Day of December, 1992

Attest:

DOUGLAS B. COMER

Attesting Officer

Acting Commissioner of Patents and Trademarks